June 2, 1959 F. SCHAEFER 2,889,476
COMMUTATOR
Filed Sept. 20, 1956
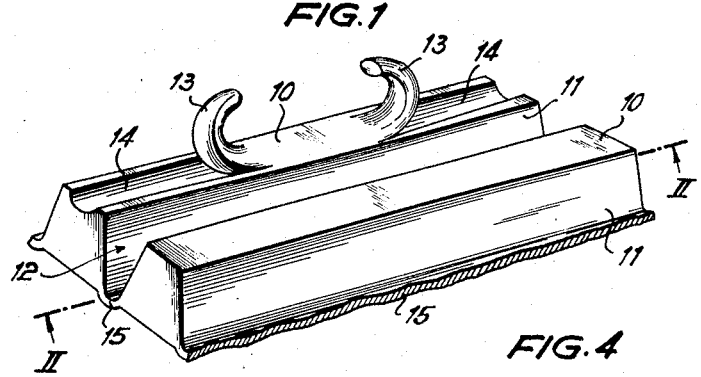
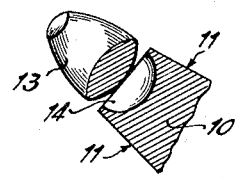
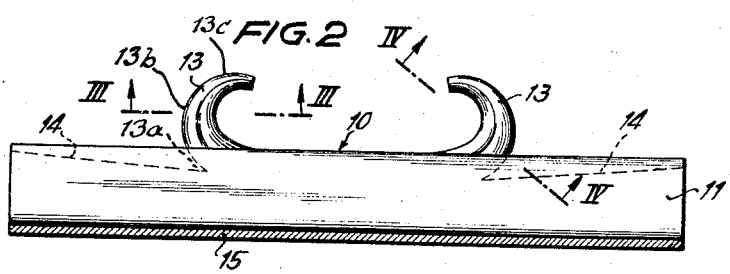
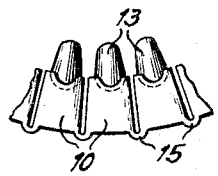
INVENTOR
Fridolin Schaefer
By Michael S. Striker
agt.

2,889,476

COMMUTATOR

Fridolin Schaefer, Stuttgart-Frauenkopf, Germany, assignor to Robert Bosch G.m.b.H., Stuttgart, Germany Application September 20, 1956, Serial No. 610,979

Claims priority, application Germany September 21, 1955

2 Claims. (Cl. 310—235)

The present invention relates to commutators and to methods for manufacturing the same.

It is conventional to manufacture commutators for electric motors by providing the commutator segments on a cylinder where the segments are interconnected by bridges forming parts of grooves between the successive segments. Each of the segments has at an inner face thereof directed toward the center of the cylinder formed by the segments a pair of anchoring hooks which may be integral with the segment, and this cylinder of segments with their anchoring hooks are located in a suitable form into which a plastic insulating material in molten state is forced under pressure so that the interconnected segments become embedded in the plastic material and the anchoring hooks securely maintain the segments in the plastic material when the latter hardens. After such embedding of the commutator segments in the plastic material, the bridges joining the segments are turned off on a suitable machine such as a lathe or the like, so as to leave the outer faces of the segments exposed and so as to provide separate commutator segments which are insulated from each other by the plastic material in which the segments are embedded.

The above-described conventional process for manufacturing commutators presents certain difficulties with respect to the anchoring hooks. Because of the great pressure with which the plastic material is pressed into the form, the anchoring hooks are easily bent so that they do not retain their shape and do not reliably maintain the segments in the finished commutator, and this undesirable effect is particularly pronounced because the plastic under pressure presses into the space between the segments and the hooks to press the latter away from the segments.

One of the objects of the present invention is to provide commutator segments with anchoring hooks which cannot become undesirably bent with respect to the segments during the embedding of the segments with their hooks in the plastic material which insulates the segments from each other.

Another object of the present invention is to form anchoring hooks of this type directly from the material of each segment in a simple, quick manner which reliably guarantees on the one hand that very strong anchoring hooks are provided which will not be capable of preventing the flow of the plastic material around the hooks and guarantees on the other hand that the hooks will be incapable of bending laterally with respect to the segments during the formation of the hooks.

With the above objects in view, the present invention mainly consists of a commutator which includes a plurality of segments each of which is provided with an outer elongated face adapted to be exposed and an inner elongated face adapted to be embedded in the insulating material of the commutator. An anchoring hook is integral with and extends at a base portion thereof from the inner face of each segment, and this anchoring hook has at its base portion an outer surface directed toward the inner face of the segment, at an intermediate portion an outer surface portion directed toward an end of the segment, and at a free end portion an outer surface portion directed away from the inner face of the segment. These outer surface portions of the hook which form one elongated outer surface of the anchoring hook are convexly curved transversely of the hook.

Also in accordance with the present invention, the hooks are each formed by moving along the inner face of each segment from an end toward the center thereof an arcuate cutting edge at the end of an elongated channel-shaped cutting tool so that this tool raises from the inner face of the segment a curved anchoring hook which has directed toward the end of the segment engaged by the cutting tool a convexly curved outer surface which is convex in a direction transverse of the hook.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a fragmentary perspective view of a portion of a strip from which commutator segments are formed, one of these segments being shown before it is worked on according to the present invention and the other of the segments being shown after it is worked on according to the present invention;

Fig. 2 is a sectional elevational view taken along line II—II of Fig. 1 in the direction of the arrows;

Fig. 3 is a sectional view taken along the line III—III of Fig. 2 in the direction of the arrows;

Fig. 4 is a sectional view taken along line IV—IV of Fig. 2 in the direction of the arrows; and Fig. 5 is an end view of a portion of a cylinder including interconnected commutator segments and adapted to be placed in a mold to be embedded in a plastic material which is introduced under pressure in the mold.

Referring now to the drawings, Fig. 1 shows a portion of an elongated metallic strip which has been suitably stamped in a known way so as to form in the strip transverse grooves 12 which separate the segments 10 from each other. The grooves 12 are defined by the adjacent side faces 11 of the successive segments 10 as well as by the bridge portions 15 which interconnect the successive segments 10 which are formed from the elongated strip of metal. The front segment 10 of Fig. 1 is shown before it is worked on according to the present invention, while the rear segment 10 of Fig. 1 is shown after it is worked on according to the present invention.

Anchoring hooks 13 are formed from the material at the inner elongated faces of the segments by a suitable cutting tool which simultaneously forms the elongated grooves 14 at the inner face of each segment 10. This unillustrated cutting tool is in the form of an elongated channel-shaped member having an arcuate cutting edge at one end thereof, and the cutting tool is applied to the inner face of each segment in such a way that the cutting tool moves from an end of each segment toward the center thereof. Furthermore, as is apparent from Fig. 2, the cutting tool is inclined with respect to the axis of the segment so that the cutting tool digs into the segment to an increasing degree as it approaches the center of the segment, and thus each of the grooves 14 becomes deeper as it becomes more distant from the end of the segment from which each groove extends.

The inward movement of this cutting tool toward the center of the inner face of each segment raises from the material of the segment the arcuate anchoring hook 13. Furthermore, the channel-shape of the cutting tool as well as the arcuate cutting edge at the end thereof causes each anchoring hook 13 to have an outer surface directed toward the inner face of the segment at the base portion 13a of each hook, toward the end of the segment at an intermediate portion 13b of each hook, and away from the inner face of the segment at the free end portion 13c of each hook which is convexly curved transversely of the hook, as is particularly apparent from Fig. 3. Furthermore, as is shown in Fig. 3, each anchoring hook 13 has a substantially elliptical cross section. Moreover, it is apparent that each of the anchoring hooks is thickest at its base portion and tapers gradually toward its free end portion.

The anchoring hooks 13 which are thus formed according to the present invention are very strong and have a great resistance to bending. Furthermore, as is particularly apparent from Fig. 4, because the outer faces of the hooks which are directed respectively toward the ends of the segment are curved convexly transversely of the hook, the plastic material which is introduced under pressure into a mold in which the commutator segments are embedded can easily flow around the hook and cannot become trapped in the space between the hook and segment so that the hooks themselves greatly resist bending and on the other hand the configuration of the hooks greatly reduce any tendency for the plastic material to provide localized areas of great pressure which will tend to bend the hooks undesirably.

This construction is in great contrast, for example, to anchoring hooks which are raised in a similar manner by a flat cutting tool from the material at the inner face of the segment and which are of rectangular cross section. Such anchoring hooks are very easily bent, and furthermore the plastic material does not easily flow around the hooks so that it becomes trapped in the spaces between the hooks and the segments and exerts a high localized pressure on the hooks which bends them undesirably. Furthermore, with the anchoring hooks 13 the channel shape of the cutting tool prevents the hooks during the formation thereof from slipping laterally with respect to the cutting tool, whereas such undesirable slipping easily occurs with a flat cutting tool.

During the formation of each anchoring hook 13 in the above-described manner, the material of the hook becomes upset in a manner which causes the total length of the hook to decrease, and as a result of this upsetting the inner face of each hook which is directed toward the center of the segment also becomes convexly curved transversely of the hook, and it is this action which gives each hook its elliptical cross section. The interconnected series of segments with the anchoring hooks thus formed at the inner faces thereof are shaped into a cylinder a part of which is shown in Fig. 5, and this cylinder is placed in a suitable form having inner and outer cylindrical surfaces which define the inner and outer limits of the space into which the plastic insulating material is introduced under high pressure. Because of the thinness of the interconnecting bridge portions 15, the latter are easily bent outwardly from the segments in the manner indicated in Fig. 5, and after the plastic material hardens within the mold with the interconnected segments embedded therein and with the hooks 13 securely holding the segments in the plastic material, the body of plastic material with the commutator segments embedded therein is removed from the mold and is turned on a suitable lathe or the like so that an outer layer of the plastic material is removed together with the bridge portions 15, so that the resulting structure provides a series of commutator segments which are separate and insulated from each other and which are securely maintained in the body of plastic material by the hooks 13.

In the above-mentioned construction where hooks of rectangular cross section are formed, the inner faces of the segments are provided with grooves corresponding to the grooves 14 but being of rectangular cross section, so that the base of each of these hooks forms together with the side faces of the rectangular grooves a pocket in which the plastic material under pressure is trapped, so that in this way the localized areas of high pressure which undesirably bend the hooks are formed. However, such trapping of the plastic material under pressure is impossible with the construction of the invention because of the convex curvature both of the groove 14 and of the outer face of each hook which is directed toward the interior of the groove 14 at the base of each hook.

The inclination of the cutting tool with respect to the inner face of each segment during formation of the grooves 14 and the hooks 13 may be on the order of 3–4°. It will be noted that the surfaces of the grooves 14 respectively form parts of frusto-cones.

The turning of the outer surface of the commutator to remove a thin layer of plastic material from the outer surface thereof as well as to remove the bridges 15 may take place after the commutator is fixed to the shaft of an electric motor or the like.

It will be understood that each of the elements described above, or two or more together, may also find a useful application in other types of commutators differing from the types described above.

While the invention has been illustrated and described as embodied in anchoring hooks for commutator segments, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a commutator, an elongated commutator segment having an outer elongated face which is adapted to be exposed and an inner elongated face which is adapted to be embedded in an insulating material, said segment having an anchoring hook integral with and extending at a base portion thereof from an intermediate part of said inner face of said segment, said hook having an outer elongated surface directed at the base portion of said hook toward said inner face of said segment, at an intermediate portion of said hook toward an end of said segment, and at an outer end portion of said hook away from said inner face of said segment, and said outer surface of said hook being convexly curved transversely of said hook, said hook being thickest and widest at its base portion and gradually tapering toward its free end portion.

2. In a commutator, an elongated commutator segment having an outer elongated face which is adapted to be exposed and an inner elongated face which is adapted to be embedded in an insulating material, said segment having an anchoring hook integral with and extending at a base portion thereof from an intermediate part of said inner face of said segment, said hook having an outer elongated surface directed at the base portion of said hook toward said inner face of said segment, at an intermediate portion of said hook toward an end of said segment, and at an outer end portion of said hook away from said inner face of said segment, and said outer surface of said hook being convexly curved transversely of said hook, and said inner face of said segment at a portion thereof directed toward said outer surface of said hook being concave and forming part of a frusto-cone.

References Cited in the file of this patent

UNITED STATES PATENTS

| | | |
|---|---|---|
| 1,426,293 | Herrmann | Aug. 15, 1922 |
| 1,826,443 | Aufiero | Oct. 6, 1931 |

FOREIGN PATENTS

| | | |
|---|---|---|
| 1,011,170 | France | Apr. 2, 1952 |